(12) United States Patent
Chen

(10) Patent No.: US 10,496,415 B2
(45) Date of Patent: Dec. 3, 2019

(54) METHOD AND SYSTEM FOR RESTARTING NETWORK SERVICE

(71) Applicant: WANGSU SCIENCE & TECHNOLOGY CO., LTD., Shanghai (CN)

(72) Inventor: Xun Chen, Shanghai (CN)

(73) Assignee: WANGSU SCIENCE & TECHNOLOGY CO., LTD, Shanghai (CN)

( * ) Notice: Subject to any disclaimer, the term of this patent is extended or adjusted under 35 U.S.C. 154(b) by 152 days.

(21) Appl. No.: 15/557,426

(22) PCT Filed: Nov. 16, 2016

(86) PCT No.: PCT/CN2016/106052
§ 371 (c)(1),
(2) Date: Sep. 11, 2017

(87) PCT Pub. No.: WO2017/143807
PCT Pub. Date: Aug. 31, 2017

(65) Prior Publication Data
US 2018/0275997 A1    Sep. 27, 2018

(30) Foreign Application Priority Data
Feb. 25, 2016  (CN) .......................... 2016 1 0104989

(51) Int. Cl.
*G06F 9/4401*  (2018.01)
*G06F 9/445*  (2018.01)

(52) U.S. Cl.
CPC .......... *G06F 9/4406* (2013.01); *G06F 9/4451* (2013.01)

(58) Field of Classification Search
CPC ............. H04L 41/0806; H04L 43/0876; G06F 11/1458; G06F 16/27; H04B 7/2123; H04Q 2213/394
(Continued)

(56) References Cited

U.S. PATENT DOCUMENTS 7,827,152 B1    11/2010  Gangasharan et al.
8,549,135 B1 *  10/2013  Yazdani ................. H04L 47/35
                                                                 709/224
(Continued)

FOREIGN PATENT DOCUMENTS

CN    104753752 A    7/2015
CN    105808287 A    7/2016

OTHER PUBLICATIONS

The World Intellectual Property Organization (WIPO) International Search Report for PCT/CN2016/106052 dated Feb. 21, 2017 5 Pages.
(Continued)

*Primary Examiner* — Mahran Y Abu Roumi
(74) *Attorney, Agent, or Firm* — Anova Law Group, PLLC

(57) ABSTRACT

The present disclosure discloses a method and system for restarting a network service. The method comprises: in response to receiving a preparation signal for restarting a network service process, configuring a packet enqueueing rule for Iptables in a Linux operating system, and caching a pending packet from a kernel space to a user space; and through implementing a packet releasing program in the user space, releasing the pending packet cached in the user space to the kernel space in response to receiving a completion signal of completing restarting the network service process, such that a connection between the pending packet and a new process of the network service is established. An IP packet filtering system caches the pending packet from the
(Continued)

kernel space to the user space, based on NFQUEUE or QUEUE. The disclosed method and system only require an Iptables command configuration and a user-space program, and are featured with advantage of simple configuration, valid for both incoming and outgoing connections, and unrestricted application scenarios, etc.

7 Claims, 2 Drawing Sheets

(58) Field of Classification Search
USPC .......................................................... 709/222
See application file for complete search history.

(56) References Cited

U.S. PATENT DOCUMENTS

| | | |
|---|---|---|
| 2011/0268113 A1 | 11/2011 | Suzuki et al. |
| 2012/0137287 A1 | 5/2012 | Pang et al. |
| 2013/0036470 A1* | 2/2013 | Zhu .................... H04L 63/0227 726/23 |
| 2013/0124807 A1* | 5/2013 | Nielsen ............... G06F 11/1438 711/162 |
| 2014/0269533 A1* | 9/2014 | Hua ...................... H04L 49/90 370/329 |
| 2015/0163197 A1 | 6/2015 | Pratapa et al. |

OTHER PUBLICATIONS

Garfielt et al. "True Zero Downtime HAProxy Relaods" <URL:www.lupaworld.com/article-252090-1.html>, Apr. 27, 2015 (Apr. 27, 2015), paragraphs [0003]-[0020]. 9 Pages.
The European Patent Office (EPO) The Extended European Search Report for 16891255.8 dated Jul. 10, 2018 9 Pages.
Rusty Russell et al Iptables(8) manpage Linux manpages, section 8 Mar. 9, 2002 pp. 1-11.
Joseph Lynch True Zero Downtime HAProxy Reloads Apr. 13, 2015 pp. 1-7 XP055489423.

* cited by examiner

METHOD AND SYSTEM FOR RESTARTING NETWORK SERVICE

CROSS-REFERENCES TO RELATED APPLICATIONS

This application is a national stage patent application of PCT application No. PCT/CN2016/106052, filed on Nov. 16, 2016, which claims priority to Chinese Patent Application No. 201610104989.X, filed on Feb. 25, 2016, the entire content of all of which is incorporated herein by reference.

FIELD OF THE INVENTION

The present disclosure relates to the technical field of Linux operating system, and in particular, relates to the technical field of network communication and system configuration in Linux operating system, and more specifically, relates to a method and a system for restarting network service.

BACKGROUND

Some network services have to restart the process in order to complete the restart or to reload configuration files, and a typical example is the HAProxy network service. By adopting the SO_REUSEPORT option, the HAProxy network service binds a new process to the same IP address and the same port as the original process to listen to the new connection, then sends a signal to notify the original process to shut down the socket on the listening port. However, during a short time period in which both the new and original processes are bound to the same IP address and the same port while the listening socket of the original process has not been closed, the new connections may arrive. According to the implementation of SO_REUSEPORT in Linux kernel, the first new connected packet (Initialization Synchronization packet, SYN packet) may be assigned to any one of the original and new processes. If the SYN packet is assigned to the original process while the listening socket of the original process is shut down, according to the TCP protocol, the server sends a TCP RST packet to the client to reset the connection.

To solve the above-mentioned problem in the network services, several solutions have been provided. One simple solution is to discard the received new SYN packet through configuring Iptables rule when reloading the process. According to the TCP protocol, if the client does not receive SYN/ACK packet, after a period of time, the client will re-send the SYN packet. However, the disadvantage of this solution is that the client has to wait for a certain period of time until the time is out, before resending the SYN packet. The waiting time is often substantially long, for example, more than 1 second, while the time for reloading the process requires only tens of milliseconds. Although the new connection is not going to be reset, a longer time delay may be introduced.

Another applicable solution is to utilize Linux traffic control tools (TC). First, Iptables are adopted to label the new incoming SYN packets, then the TC tool is adopted to temporarily cache these packets. After the process completes the reloading, the SYN packets are released. Compared to the previous solution, this solution may have a relatively short time delay. However, because the TC tool is only capable of controlling the outflow of the traffic, the corresponding application scenarios may be rather limited.

BRIEF SUMMARY OF THE DISCLOSURE

In view of the abovementioned disadvantages of the prior art, one objective of the present disclosure is to provide a method and system for restarting network services, which may solve the problems of substantially long waiting time of processing a pending packet or restricted processing when restarting network service in the prior art.

To achieve the above objectives and other related objectives, the present disclosure provides a method for restarting a network service, comprising: in response to receiving a preparation signal for restarting a network service process, configuring a packet enqueueing rule for Iptables in a Linux operating system to cache a pending packet from a kernel space to a user space; and in response to receiving a completion signal of completing restarting the network service process, reading the pending packet cached in the user space and releasing the pending packet which has been read to the kernel space, such that a connection between the pending packet and a new process of the network service is established.

Optionally, the method for restarting a network service includes configuring the packet enqueueing rule with the Iptables NFQUEUE/QUEUE target, and caching the pending packet from the kernel space to the user space.

Optionally, the method for restarting a network service includes implementing a packet releasing program in the user space to read the pending packet cached in the user space and release the pending packet which has been read to the kernel space, in response to receiving the completion signal of completing restarting the network service process.

Optionally, the packet releasing program calls libNetfilter_queue library or libipq library.

To achieve the above objectives, the present disclosure provide a system for restarting a network service, comprising: a configuration module, configured to, in response to receiving a preparation signal for restarting a network service process, configuring a packet enqueueing rule for Iptables in a Linux operating system to cache a pending packet from a kernel space to a user space; and a release module, configured to, in response to receiving a completion signal of completing restarting the network service process, reading the pending packet cached in the user space and releasing the pending packet which has been read to the kernel space, such that a connection between the pending packet and a new process of the network service is established.

Optionally, the configuration module is further configured to configure the packet enqueueing rule with the Iptables NFQUEUE/QUEUE target, and cache the pending packet from the kernel space to the user space.

Optionally, the release module includes a packet releasing program implemented in the user space, through executing the packet releasing program, the release module is configured to read the pending packet cached in the user space and release the pending packet which has been read to the kernel space, in response to receiving the completion signal of completing restarting the network service process.

Optionally, the packet releasing program calls libNetfilter_queue library or libipq library.

Accordingly, the present disclosure provides a method and a system for restarting a network service, which have the following advantages:

1. Through utilizing the NFQUEUE or QUEUE target in the Netfilter framework, a method of restarting the network service without packet loss based on packet cache technology is realized, which only requires an Iptables command configuration and a user-space program. The disclosed method for restarting the network service exhibit various advantages, such as simple configuration, valid for both incoming and outgoing connections, and unrestricted application scenarios, etc.

2. The programs for processing the cached pending packets in the user space is substantially simple, without modifying the source codes of Linux kernel or Network service programs.

DESCRIPTION OF COMPONENT LABELS

1 System for restarting a network service
11 Configuration module
12 Release module
S1~S2 Steps

DETAILED DESCRIPTION

Embodiments of the present disclosure will now be described by specific examples, and other advantages and utilities of the invention will be readily apparent to those skilled in the art from the disclosure of this specification. The present disclosure may also be implemented in or practiced with other embodiments, and various details in this specification may be altered or modified based on various points and applications without departing from the spirit or the scope of the present disclosure.

One objective of the present disclosure is to provide a method and system for restarting network service, which may solve the problems of substantially long waiting time of processing a pending packet or restricted processing when restarting network service in the prior art. The principles and embodiments of the method and system for restarting network services provided by the present disclosure will be described in detail below, in view of which those skilled in the art can understand the disclosed method and system for restarting network service without creative effort.

Figure 1:
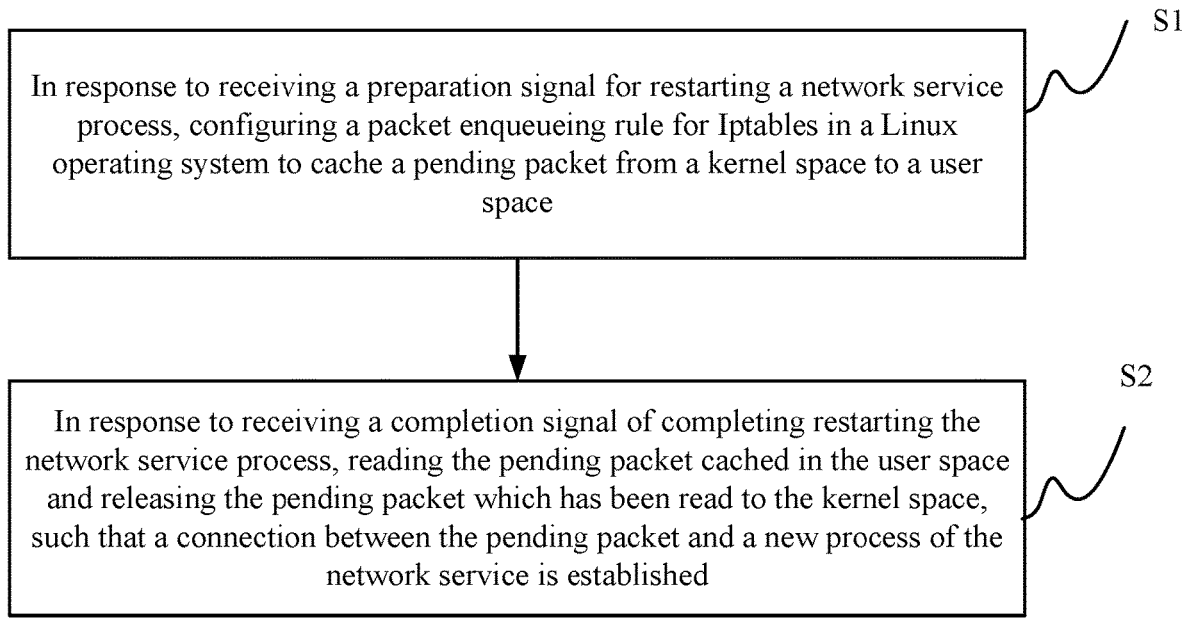
FIG. 1 illustrates a flow chart of an exemplary method of restarting a network service consistent with disclosed embodiments.
Figure 2:
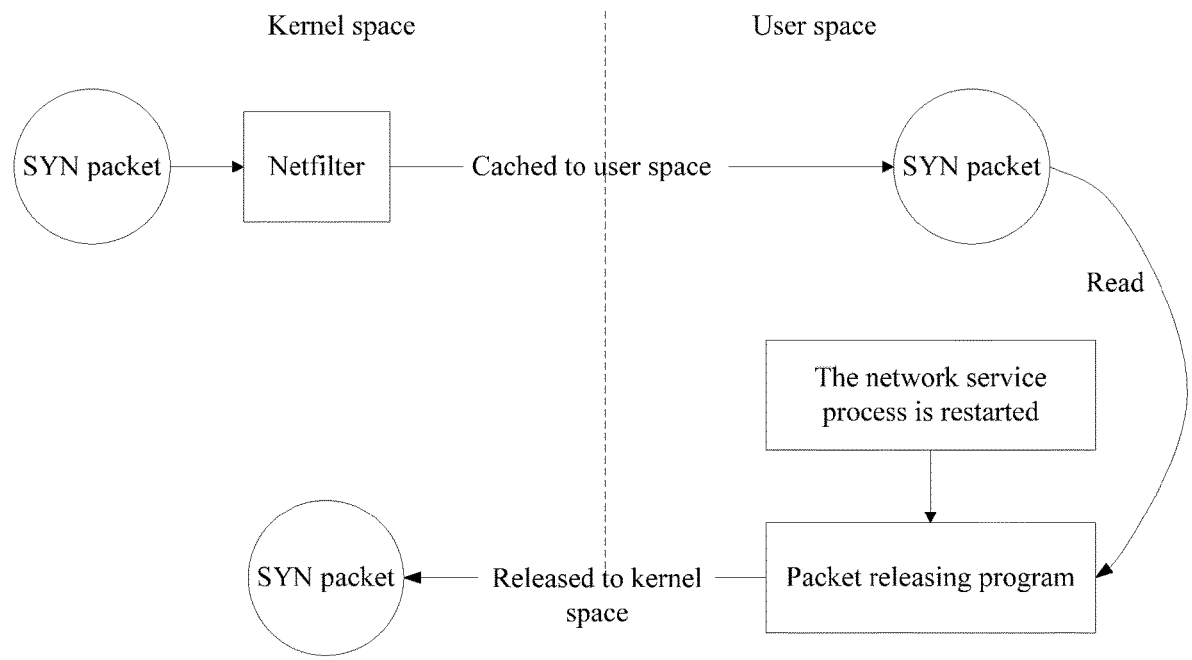
FIG. 2 illustrates an exemplary packet processing in an exemplary method of restarting a network service consistent with disclosed embodiments.
Figure 3:
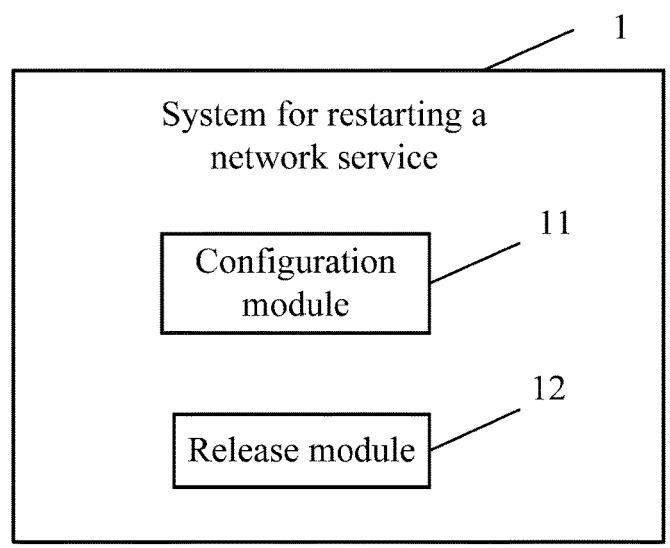
FIG. 3 illustrates a block diagram of an exemplary system for restarting a network service consistent with disclosed embodiments.

As shown in FIGS. 1 to 3, the present disclosure provides a method and a system for restarting a network service, which may be applicable to restart a network service in Linux operating system. Through adopting NFQUEUE/QUEUE mechanism of Iptables tool, the disclosed method and system for restarting the network service may be able to restart the network service, such that when restarting the network service, all the new connections may be normally processed without a connection interpretation. Compared with the existing methods, the disclosed method and system for restarting the network service may have various advantages, such as simple configuration, valid for both incoming and outgoing connections, and unrestricted application scenarios, etc.

FIG. 1 illustrates a flow chart of an exemplary method of restarting a network service consistent with disclosed embodiments. The method of restarting the network service may comprise the following steps.

Step S1: In response to receiving a preparation signal for restarting a network service process, configuring a packet enqueueing rule for Iptables in a Linux operating system to cache a pending packet from a kernel space to a user space.

In the disclosed embodiments, Iptables is an IP packet filtering system integrated with the latest 3.5 version Linux kernel. That is, in the disclosed embodiments, the IP packet filtering system may be a Netfilter/Iptables packet filtering system. When the Linux system is connected to an Internet or LAN, a server, or a proxy server that connects to the LAN and the Internet, the IP packet filtering system may better control the IP packet filtering and firewall configuration in the Linux operating system.

The Netfilter/Iptables packet filtering system is a powerful tool for adding, editing and removing rules. Although named as a single entity, in fact the Netfilter/Iptables packet filtering system includes two components: Netfilter and Iptables.

The Iptables component is a user space tool which facilitates the insert, modification, and removal of rules in a packet filtering table.

The Netfilter component, also known as a kernel space component, is a part of the Linux kernel. The Netfilter component may consist of packet filtering tables containing a set of rules through which that the kernel controls packet filtering. Netfilter is a subsystem in the Linux kernel and is related to network functionality. As a general and abstract framework, Netfilter provides packet filtering, packet modification, network address translation, and other functions.

In particular, in the disclosed embodiments, the IP packet filtering system may cache the pending packets into the user space in a queue form. Further, the IP packet filtering system may configure the packet enqueueing rule with the Iptables NFQUEUE/QUEUE target, and cache the pending packet from the kernel space to the user space. NFQUEUE or QUEUE is a specific function module of Netfilter/Iptables, and the NFQUEUE or QUEUE function module may be configured to enqueue the packets. The packet enqueueing rule for the NFQUEUE or QUEUE function module to enqueue packets may be configured according to the required configuration parameters.

In particular, as shown in FIG. 2, when the network service process is going to be restarted, an Iptables rule for caching a TCP SYN packet to the user spacer by Netfilter's NFQUEUE or QUEUE target may be added, in which the TCP SYN packet is received by the listening port of the service process. After adding the Iptables configuration, because a new TCP SYN packet is cached to the user space, the new TCP SYN packet may not establish a connection with any of new and original service processes.

In various functions provided by Netfilter, the disclosed method may utilize NFQUEUE or QUEUE to enqueue packets into the user space, then process and decide the destination of the enqueued packets (accept, discard or further processing, etc.) by a pre-determined user-space program. If the incoming packets are not immediately processed by the pre-determined user-space program, the packets may be temporarily cached in the queue. Thus, NFQUEUE or QUEUE function of NetFilter may actually provide a way to cache packets.

Step S2, in response to receiving a completion signal of completing restarting the network service process, reading the pending packet cached in the user space and releasing the pending packet which has been read to the kernel space, such that a connection between the pending packet and a new process of the network service is established.

As shown in FIG. 2, after the process for restarting network service has restarted the script and completed the transition between the old and new process, the pending packet cached in the user space may be read and released to the kernel space, such that a connection between the pending packet and a new process of the network service may be established.

In particular, in the disclosed embodiments, a packet releasing program may be implemented in the user space. The packet releasing program may be configured to read the pending packet cached in the user space and release the pending packet which has been read to the kernel space, in response to receiving the completion signal of completing restarting the network service process.

Optionally, in the disclosed embodiments, the packet releasing program may call libNetfilter_queue library or libipq library.

That is, the packet releasing program may be running in the user space and may be implemented by libraries including but not limited to the libNetfilter_queue and libipq libraries. The packet releasing program may only wait for the script to restart the network service to be executed and the transition between the original and new processes to be completed, before releasing the pending packet to the kernel space. Because the original process has exited and only the new process is in a listening state, all the previously released SYN packets may establish a connection with the new process.

According to the disclosed method for restarting the network service, during the transition between the new process and original process, the newly received SYN packet may be cached to the user space based on NFQUEUE or QUEUE of Iptables. After the transition between the new process and original process has been completed, the cached SYN packet may be received by a user-space program, such that the cached SYN packet may enter the kernel space again and get connected to the new process.

To implement the disclosed method for restarting the network service, the present disclosure also provides a system for restarting the network service. In particular, as shown in FIG. 3, the system for restarting the network service may include: a configuration module and a release module.

In the disclosed embodiments, the configuration module may be configured to, in response to receiving a preparation signal for restarting the network service process, configure a packet enqueueing rule with Iptables in a Linux operating system to cache a pending packet from a kernel space to a user space. Because the disclosed system and method for restarting the network service have the same principle, the description of Iptables and Netfilter is not be repeated here.

In particular, the configuration module may be configured to configure the packet enqueueing rule with the Iptables NFQUEUE/QUEUE target, and cache the pending packet from the kernel space to the user space. NFQUEUE or QUEUE may be a specific function module of Netfilter/Iptables, and the NFQUEUE or QUEUE function module may be configured to enqueue the packets. The packet enqueueing rule for the NFQUEUE or QUEUE function module to enqueue packets may be determined according to the principle of enqueueing packets by the NFQUEUE or QUEUE function module and the required configuration parameters.

In particular, as shown in FIG. 2, when the network service process is going to be restarted, an Iptables configuration for caching a TCP SYN packet to the user spacer by Netfilter's NFQUEUE or QUEUE target may be added, in which the TCP SYN packet is received by the listening port of the service process. After adding the Iptables configuration, because a new TCP SYN packet is cached to the user space, the new TCP SYN packet may not establish a connection with any of new and original service processes.

In response to receiving a completion signal of completing restarting the network service process, the release module may be configured to read the pending packet cached in the user space and release the pending packet which has been read to the kernel space, such that a connection between the pending packet and a new process of the network service may be established.

As shown in FIG. 2, after the process for restarting network service has restarted the script and completed the transition between the original and new processes, the pending packet cached in the user space may be read and released to the kernel space, such that a connection between the pending packet and a new process of the network service may be established.

In particular, in the disclosed embodiments, the release module may include a packet releasing program implemented in the user space. In response to receiving the completion signal of completing restarting the network service process, the packet releasing program may be configured to read the pending packet cached in the user space and release the pending packet which has been read to the kernel space.

Optionally, in the disclosed embodiments, the packet releasing program may call libNetfilter_queue library or libipq library.

That is, the packet releasing program may be running in the user space and may be implemented by libraries including but not limited to the libNetfilter_queue and libipq libraries. The packet releasing program may only wait for the script to restart the network service to be executed and the transition between the original and new processes to be completed, before releasing the pending packet to the kernel space. Because the original process has exited and only the new process is in a listening state, all the previously released SYN packets may establish a connection with the new process.

In summary, through utilizing the NFQUEUE or QUEUE target in the Netfilter framework and packet cache technology, the present disclosure provides a method of restarting the network service without packet loss, which may be realized by an Iptables command configuration and a user-space program. The disclosed method for restarting the network service may have various advantages, such as simple configuration, valid for both incoming and outgoing connections, and unrestricted application scenarios, etc. The programs for processing the cached pending packets in the user space may also be substantially simple, without modifying the source codes of Linux kernel or Network service programs. Thus, the present disclosure may effectively overcome the disadvantages of the prior art and show a high industrial utilization value.

The disclosed embodiments only illustrate the principles and efficacy of the present disclosure, and are not intended to limit the scope of the present disclosure. Various modifications to these embodiments will be readily apparent to those skilled in the art, and the generic principles defined herein may be applied to other embodiments without departing from the spirit or scope of the invention. Accordingly, the claims cover all modifications made by those skilled in the art to without departing from the spirit or scope of the invention.

What is claimed is:

1. A method for restarting a network service, comprising:
receiving a preparation signal for restarting a network service process indicating that a transition is going to occur from an original process to a new process, and configuring a packet enqueueing rule for Iptables in a Linux operating system to cache a pending packet from a kernel space to a user space, wherein the pending packet is an Initialization Synchronization (SYN) packet and is an incoming packet;
enqueueing the pending packet to the user space based on the packet enqueueing rule, and using a pre-determined program to process and determine a destination of the pending packet, the pre-determined program being a program configured in the user space, the destination of the pending packet including at least one of accept, discard, and further processing;
after the pending packet is enqueued to the user space, if the pending packet is not immediately processed by the pre-determined program, temporarily caching the pending packet using a NFQUEUE/QUEUE function of NetFilter; and
receiving a completion signal of completing restarting the network service process indicating that the transition from the original process to the new process is completed, and reading, by using a packet releasing program configured in the user space, the pending packet cached in the user space and releasing, by using the packet releasing program, the pending packet which has been read to the kernel space, wherein the packet releasing program only waits for the transition between the original process and the new process to be completed before releasing the pending packet to the kernel space, and the original process has exited and only the new process is in a listening state, such that a connection between the pending packet and the new process of the network service is established.

2. The method for restarting a network service according to claim 1, wherein: the packet enqueueing rule with an Iptables NFQUEUE/QUEUE target is configured to cache the pending packet from the kernel space to the user space.

3. The method for restarting a network service according to claim 1, wherein: a packet releasing program in the user space is implemented to read the pending packet cached in the user space and release the pending packet which has been read to the kernel space, in response to receiving the completion signal of completing restarting the network service process.

4. The method for restarting a network service according to claim 3, wherein: the packet releasing program calls libNetfilter_queue library or libipq library.

5. The method for restarting a network service according to claim 2, wherein: a packet releasing program in the user space is implemented to read the pending packet cached in the user space and release the pending packet which has been read to the kernel space, in response to receiving the completion signal of completing restarting the network service process.

6. The method for restarting a network service according to claim 5, wherein: the packet releasing program calls libNetfilter_queue library or libipq library.

7. The method for restarting a network service according to claim 1, wherein:
the pending packet is a TCP SYN packet.

* * * * *